(12) United States Patent
Davidson

(10) Patent No.: US 12,208,605 B2
(45) Date of Patent: Jan. 28, 2025

(54) METHOD FOR MAKING A LAMINATED GLAZING PANEL

(71) Applicant: PILKINGTON GROUP LIMITED, Lathom (GB)

(72) Inventor: Michael John Davidson, Warrington (GB)

(73) Assignee: Pilkington Group Limited, Lathom (GB)

( * ) Notice: Subject to any disclaimer, the term of this patent is extended or adjusted under 35 U.S.C. 154(b) by 90 days.

(21) Appl. No.: 17/794,678

(22) PCT Filed: Jan. 27, 2021

(86) PCT No.: PCT/GB2021/050188
§ 371 (c)(1),
(2) Date: Jul. 22, 2022

(87) PCT Pub. No.: WO2021/152305
PCT Pub. Date: Aug. 5, 2021

(65) Prior Publication Data
US 2023/0073127 A1 Mar. 9, 2023

(30) Foreign Application Priority Data

Jan. 27, 2020 (GB) ...................................... 2001117

(51) Int. Cl.
*B32B 7/08* (2019.01)
*B32B 3/10* (2006.01)
(Continued)

(52) U.S. Cl.
CPC ............... *B32B 7/08* (2013.01); *B32B 3/10* (2013.01); *B32B 3/266* (2013.01);
(Continued)

(58) Field of Classification Search
CPC .. B32B 7/08; B32B 3/10; B32B 3/266; B32B 17/10036; B32B 17/1055;
(Continued)

(56) References Cited

U.S. PATENT DOCUMENTS

| 6,735,921 | B2 | 5/2004 | Oberhofer et al. |
| 10,773,485 | B2 | 9/2020 | Uebelacker et al. |

(Continued)

FOREIGN PATENT DOCUMENTS

| EP | 2075121 A1 | 7/2009 |
| WO | WO 2012/031332 A1 | 3/2012 |

(Continued)

OTHER PUBLICATIONS

UK Intellectual Property Office, GB Search Report; issued in GB2001117.7, Jul. 22, 2020, 1 page, UK Intellectual Property Office, Newport, South Wales.

(Continued)

*Primary Examiner* — Brian Handville
(74) *Attorney, Agent, or Firm* — Marshall & Melhorn, LLC

(57) ABSTRACT

A method for making a laminated glazing panel is described. A bolt having a head portion and a stem portion extending therefrom is positioned in a hole in a sheet of glazing material so that a first surface of the head portion is faces in the direction of a first major surface of the sheet of glazing material and the stem portion extends beyond a second major surface of the sheet of glazing material. A sheet of adhesive interlayer material is positioned on the first major surface of the sheet of glazing material to cover the first surface of the head portion. Suitable lamination conditions are used to laminate the sheet of adhesive interlayer material to the sheet of glazing material. During lamination, fluid trapped between the first surface of the head portion and the (Continued)

sheet of adhesive interlayer material is removed via a fluid pathway associated with the stem portion. Laminated glazing panels made using the method are also described.

20 Claims, 6 Drawing Sheets

(51) Int. Cl.
  *B32B 3/26* (2006.01)
  *B32B 17/10* (2006.01)
  *B32B 37/12* (2006.01)
  *B32B 37/20* (2006.01)
  *B32B 38/18* (2006.01)
  *B32B 38/16* (2006.01)

(52) U.S. Cl.
  CPC .... *B32B 17/10036* (2013.01); *B32B 17/1055* (2013.01); *B32B 17/10935* (2013.01); *B32B 37/1284* (2013.01); *B32B 37/20* (2013.01); *B32B 38/1833* (2013.01); *B32B 2038/166* (2013.01); *B32B 2250/02* (2013.01); *B32B 2315/08* (2013.01); *B32B 2398/00* (2013.01)

(58) Field of Classification Search
  CPC .......... B32B 17/10935; B32B 37/1284; B32B 37/20; B32B 38/1833; B32B 2038/166; B32B 2250/02; B32B 2315/08; B32B 2398/00; B32B 2419/00; B32B 3/06; B32B 17/10018; B32B 17/10743; B32B 17/10752; B32B 17/10761; B32B 17/1077; B32B 17/10788
  See application file for complete search history.

(56) References Cited

U.S. PATENT DOCUMENTS

2002/0020119 A1    2/2002   Oberhofer et al.
2005/0188634 A1*   9/2005   Bolton ............. B32B 17/10761
                                                      52/235

FOREIGN PATENT DOCUMENTS

WO      WO 96/22443 A1    5/2017
WO      WO 2017/084767 A1    5/2017

OTHER PUBLICATIONS

European Patent Office, International Search Report with Written Opinion, issued in PCT/GB2021/050187, Apr. 20, 2021, 13 pages, European Patent Office, Rijswijk, Netherlands.

* cited by examiner

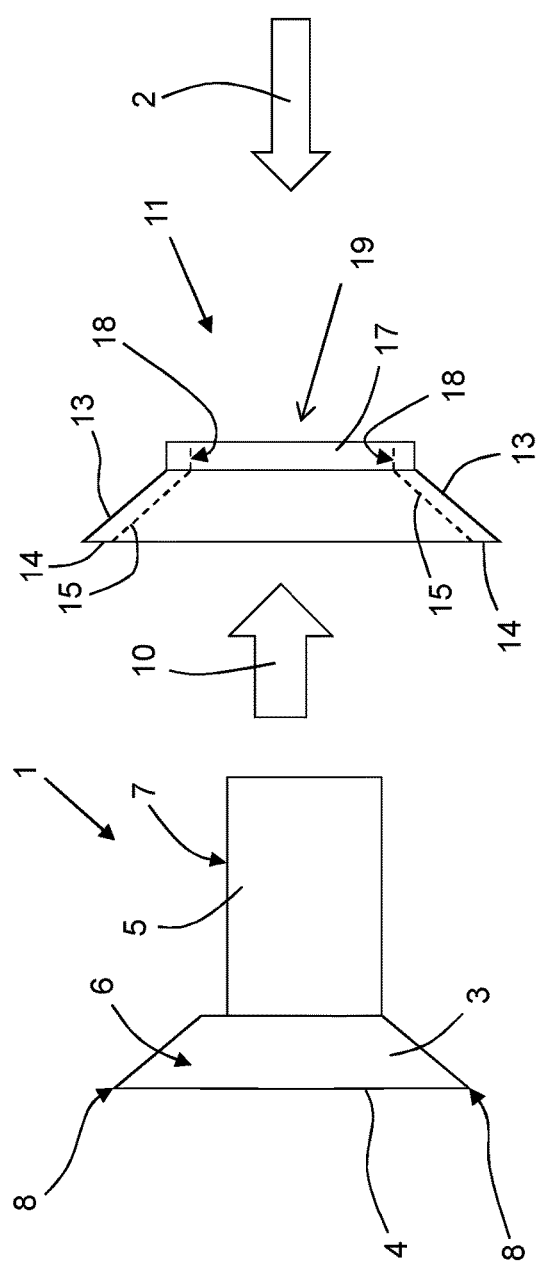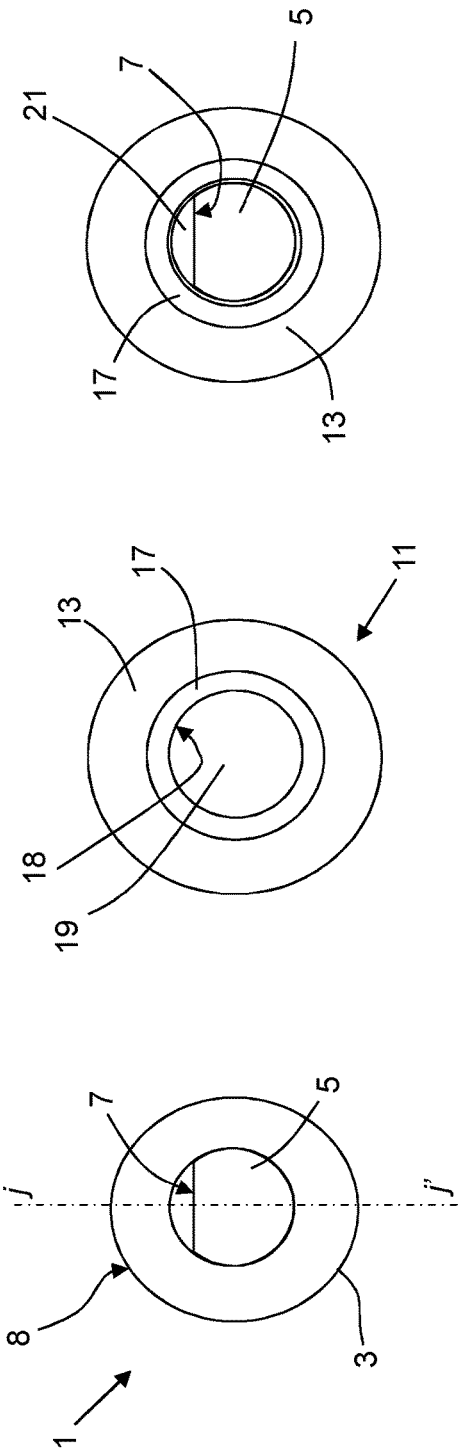

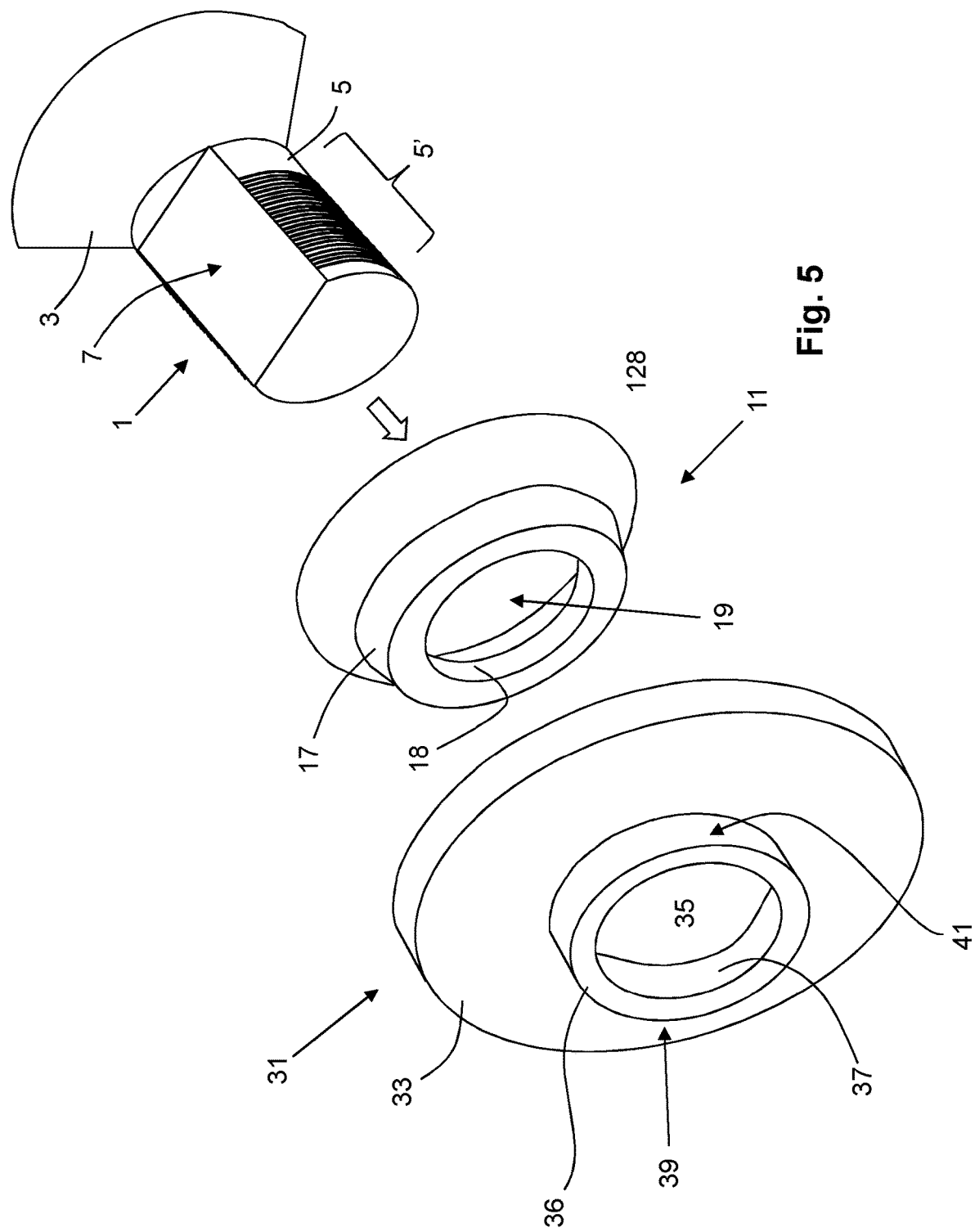

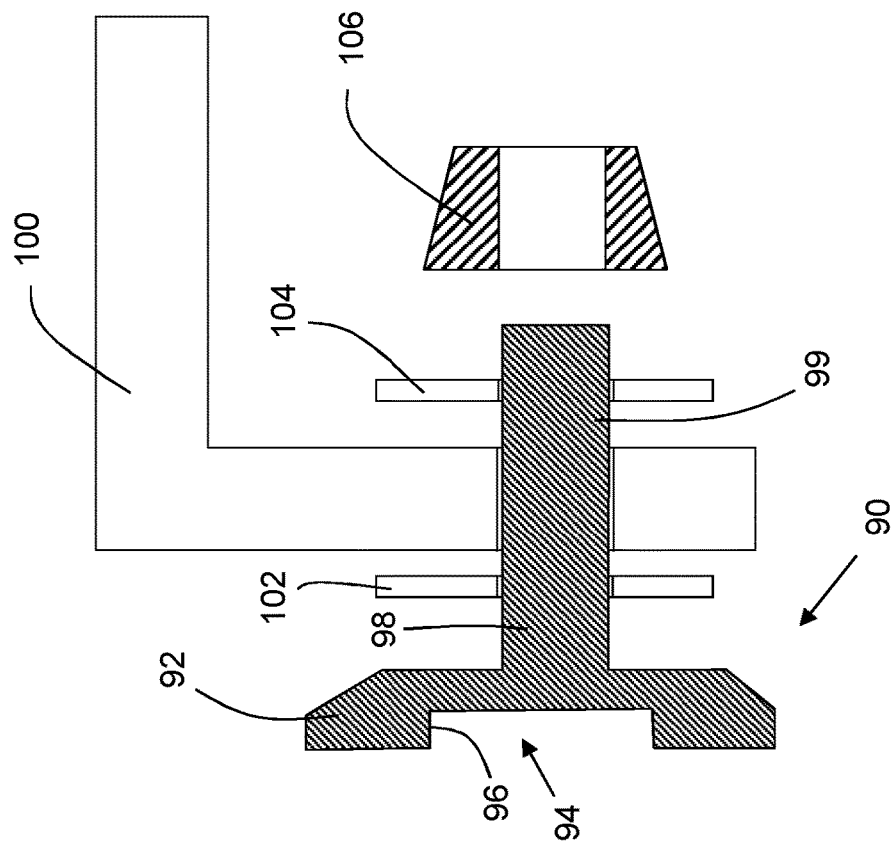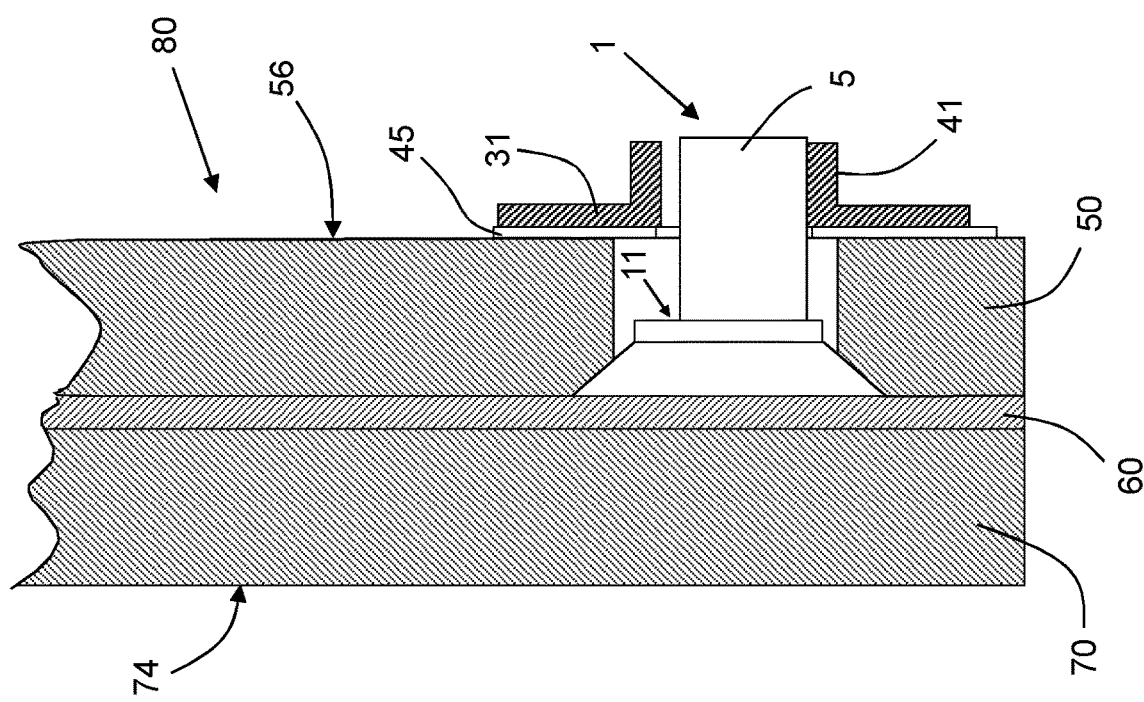
Fig. 8

METHOD FOR MAKING A LAMINATED GLAZING PANEL

BACKGROUND OF THE INVENTION

The present invention relates to a method for making a laminated glazing panel and to a laminated glazing panel.

Frameless glazing systems for buildings are well known. Buildings incorporating a structural glass façade or curtain wall incorporating the Pilkington PLANAR™ glazing system are one such example. This type of structural glazing system comprises a plurality of glazing panels ranging typically in size between 1 m×1 m and 2.5 m×4.5 m or larger, for example 3m×6 m, wherein each glazing panel is independently secured to an adjacent support structure via mechanical mountings and fittings. Each glazing panel usually comprises a sheet of glass that has been toughened and may be laminated to meet specific legislative requirements. Each glazing panel may be double or triple glazed to provide increased environmental performance.

In such frameless glazing systems, each glazing panel usually has a number of holes drilled through it, which may be straight or countersunk holes, for securing a glazing fitting thereto. For a rectangular glazing panel, the fixing holes or bores are usually in the vicinity of each corner and a glazing fitting is secured to the glazing panel via each hole. Depending upon the size of the glazing panel, additional holes may be located at other positions around the periphery of the panel.

Frameless glazing systems are known comprising glazing panels having two sheets of glass joined by an interlayer sheet where the glazing fitting is secured to the glazing panel via a hole that passes through both sheets of glass, or via a hole that passes through only one of the sheets of glass. One such glazing system is available from Nippon Sheet Glass, Co. and is known as Pilkington Planar™ Integral, see https://www.pilkington.com/en-gb/uk/architects/types-of-glass/structural-glazing/system-components/glass/laminated-safety-glass/pilkington-planar-intergral.

In such glazing systems the laminated glazing panel has a countersunk flat head bolt positioned in a corresponding countersunk hole in a glass sheet such that the flat head faces the adhesive interlayer material. The adhesive interlayer material joins the glass sheet having the countersunk hole therein to a second glass sheet that has no holes therein. The second glass sheet is used as an external facing sheet so that the exterior surface of the façade incorporating said glazing panels is flush and is easier to maintain. Such laminated glazing panels are described in WO96/22443A1.

A problem with such glazing panels is during the lamination process used to join the glass sheet having the countersunk hole therein and with the countersunk flat head bolt in the countersunk hole in the glass sheet to a second glass sheet by means of a suitable adhesive interlayer material, is that in the vicinity of the countersunk flat head bolt there is an increased potential for delamination.

SUMMARY OF THE INVENTION

The present invention at least partially overcomes this problem.

Accordingly the present invention provides from a first aspect a method for making a laminated glazing panel, the laminated glazing panel comprising a first sheet of glazing material joined to an interlayer structure comprising at least a first sheet of adhesive interlayer material, the method comprising the steps: (i) providing a first sheet of glazing material having at least a first hole extending between a first major surface and a second major surface thereof; (ii) providing a glazing fitting comprising: a bolt having a head portion and a stem portion extending therefrom, the head portion having a first surface and an opposing second surface and the stem portion being configured to provide at least one fluid pathway associated therewith; (iii) positioning the head portion in the first hole such that the first surface of the head portion faces in the direction of the first major surface of the first sheet of glazing material and the stem portion extends beyond the second major surface of the first sheet of glazing material; (iv) providing a first sheet of adhesive interlayer material; (v) positioning the first sheet of adhesive interlayer material on the first major surface of the first sheet of glazing material to cover the first surface of the head portion; and (vi) laminating the first sheet of adhesive interlayer material to the first sheet of glazing material using suitable lamination conditions; wherein during step (vi) fluid trapped between the first surface of the head portion and the first sheet of adhesive interlayer material is removed via the fluid pathway.

The inclusion of a fluid pathway associated with the stem portion makes it easier to remove any fluid that is between the first surface of the head portion and the first sheet of adhesive interlayer material.

The first hole in the first sheet of glazing material has a first opening in the first major surface of the first sheet of glazing material in communication with a second opening in the second major surface of the first sheet of glazing material. The first hole has a wall that connects the first opening in the first major surface of the first sheet of glazing material to the second opening in the first sheet of glazing material. That is, the wall of the first hole is between the first opening in the first major surface of the first sheet of glazing material and the second opening in the second major surface of the first sheet of glazing material.

Preferably the first hole is inboard a peripheral edge of the first sheet of glazing material.

Preferably the glazing fitting comprises a washer configured to fit in the first hole in the first sheet of glazing material and configured such that the head portion nests therein, and wherein the washer is positioned in the first hole in the first sheet of glazing material before step (iii), such that at step (iii), the head portion is positioned in the washer that is positioned in the first hole in the first sheet of glazing material.

Preferably the first surface of the head portion is flat, or substantially flat.

Preferably the head portion is a countersunk head portion. In such embodiments the bolt may be referred to as a countersunk bolt.

Preferably after the head portion has been positioned in the first hole at step (iii), the first surface of the head portion is aligned with the first major surface of the first sheet of glazing material.

Preferably the fluid is air.

Preferably the first sheet of adhesive interlayer material comprises an ionomer polymer, polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first sheet of adhesive interlayer material has a thickness between 0.3 mm and 5 mm, more preferably between 0.38 mm and 1 mm.

Preferably the first sheet of glazing material comprises a sheet of glass, in particular a sheet of float glass.

Preferably the first sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the first sheet of glazing material is thermally or chemically toughened glass.

Preferably the first sheet of glazing material has a thickness between 4 mm and 25 mm, more preferably between 6 mm and 20 mm.

The stem portion has a length and a first axis running along the length of the stem portion.

Preferably the stem portion is cylindrical having a first end adjacent the head portion and an opposite second end, and wherein a portion of the curved surface of the cylindrical stem portion has been removed to provide the fluid pathway.

Preferably the fluid pathway comprises a flat portion running along the length of the stem portion.

Preferably the fluid pathway comprises a flat portion running along the entire length of the stem portion.

In some embodiments the stem portion is configured to engage with a mechanical fastener.

Preferably the mechanical fastener comprises a body portion having a hole therein, the hole being configured to engage with the stem portion.

Preferably the hole in the body portion is circular.

Preferably the stem portion comprises a threaded region for engagement with a suitably configured mechanical fastener.

When the stem portion comprises a threaded region, the hole in the body of the fastener is preferably a threaded hole.

In some embodiments after step (iii) and before step (vi) a mechanical fastener is attached to the stem portion to clamp the bolt to the first sheet of glazing material. In such embodiments, at least a portion of the fluid pathway is formed with a portion of the mechanical fastener.

The mechanical fastener is usually a tight fit with stem portion and by having a fluid pathway in accordance the present invention the removal of fluid trapped between the first surface of the head portion and the first sheet of adhesive interlayer material may be improved.

Preferably the mechanical fastener comprises a body portion having a hole therein, the hole being configured to engage with the stem portion, wherein the stem portion has circular symmetry about the first axis and the hole in the body portion of the mechanical fastener is configured such that when the stem portion is attached to the mechanical fastener the fluid pathway extends through the mechanical fastener. The hole in the body portion of the mechanical fastener is preferably non-circular in such embodiments.

Preferably the mechanical fastener comprises a body portion having a hole therein, the hole being configured to engage with the stem portion, wherein the hole in the body portion of the mechanical fastener is circular and the stem portion has a portion thereof removed such that when the stem portion is attached to the mechanical fastener the fluid pathway extends through the mechanical fastener.

Preferably the mechanical fastener comprises a body portion having a hole therein, the hole being configured to engage with the stem portion, wherein the stem portion has a portion thereof removed and the hole in the body portion of the mechanical fastener is non-circular such that when the stem portion is attached to the mechanical fastener the fluid pathway extends through the mechanical fastener.

In some embodiments after step (iii) and after step (vi) a mechanical fastener is attached to the stem portion to clamp the bolt to the first sheet of glazing material.

Preferably the mechanical fastener comprises a body portion having a hole therein, the hole being configured to engage with the stem portion, wherein the stem portion has circular symmetry about the first axis and the hole in the body portion of the mechanical fastener is configured such that when the stem portion is attached to the mechanical fastener the fluid pathway extends through the mechanical fastener.

Preferably the mechanical fastener comprises a body portion having a hole therein, the hole being configured to engage with the stem portion, wherein the hole in the body portion of the mechanical fastener is circular and the stem portion has a portion thereof removed such that when the stem portion is attached to the mechanical fastener the fluid pathway extends through the mechanical fastener.

Preferably the mechanical fastener comprises a body portion having a hole therein, the hole being configured to engage with the stem portion, wherein the stem portion has a portion thereof removed and the hole in the body portion of the mechanical fastener is non-circular such that when the stem portion is attached to the mechanical fastener the fluid pathway extends through the mechanical fastener.

In some embodiments the head portion comprises at least a first channel extending therethrough, the first channel communicating at a first end with an entrance hole in the first surface of the head portion and at a second end with an exit hole in the second surface of the head portion. The provision of at least one channel in the head portion provides an additional fluid pathway to remove fluid such as air that may be trapped between the first surface of the head portion and the first sheet of adhesive interlayer material during step (iii). The provision of first channel in the head portion also allows some of the first sheet of adhesive interlayer material to flow into the first channel during step (vi) so that the head portion may become attached to the first sheet of adhesive interlayer material following step (vi).

In some embodiments the first hole is a countersunk hole and the head portion is a countersunk head portion.

Preferably the first surface of the head portion is aligned with the first major surface of the first sheet of glazing material after the head portion is positioned in the first hole at step (iii).

Preferably the glazing fitting comprises a washer and the head portion is in the washer when the head portion is positioned in the first hole at step (iii).

In some embodiments the stem portion is cylindrical has a diameter d and a length l and has a first end adjacent the head portion and an opposite second end, wherein a portion of the curved surface of the cylindrical stem portion has been removed to provide the fluid pathway.

Preferably the fluid pathway comprises a flat portion running along the length of the stem portion.

Preferably the fluid pathway comprises a flat portion running along the entire length of the stem portion.

Preferably the flat portion has a width and a length, wherein the width of the flat portion is between d/20 and d, more preferably between d/10 and d, even more preferably between d/5 and d.

Preferably the flat portion has a width and a length, wherein the length of the flat portion is between l and l/10, more preferably between l and l/5, even more preferably between l and l/2.

When the length of the flat portion is less than l, it is preferred that the flat portion is at the first end of the stem portion.

Preferably the stem portion has a diameter between 5 mm and 50 mm.

When the stem portion has a threaded portion, the diameter of the stem portion is suitably the distance between opposite sides of a thread, or an average diameter taking the depth of the thread into account. Alternatively, the diameter of the stem portion may be the diameter of the stem portion before the threaded portion was added thereto.

In some embodiments following step (v) a second sheet of glazing material is positioned on the first sheet of adhesive interlayer material such that following step (vi) the laminated glazing panel produced has the first sheet of adhesive interlayer material between the first and second sheets of glazing material. In such embodiments during step (vi) the first sheet of glazing material is joined to the second sheet of glazing material by at least the first sheet of adhesive interlayer material.

Preferably the second sheet of glazing material has no holes therein.

Preferably the second sheet of glazing material comprises a sheet of glass, in particular a sheet of float glass.

Preferably the second sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the second sheet of glazing material has a thickness between 4 mm and 25 mm, more preferably between 6 mm and 20 mm.

Preferably the second sheet of glazing material is thermally or chemically toughened glass.

In some embodiments the fluid pathway comprises a hole running through the stem portion and through the first surface of the head portion.

In some embodiments the method is carried out in a controlled atmosphere and the fluid removed during step (iv) comprises some of the controlled atmosphere.

From another aspect the present invention provides a laminated glazing panel comprising a first sheet of glazing material joined to an interlayer structure comprising at least a first sheet of adhesive interlayer material, the first sheet of glazing material having at least a first hole extending between a first major surface and a second major surface thereof; the laminated glazing panel comprising a glazing fitting comprising a bolt having a head portion and a stem portion extending therefrom, the head portion having a first surface and an opposing second surface and the stem portion being configured with at least one fluid pathway associated therewith; wherein the head portion is positioned in the first hole such that the first surface of the head portion faces in the direction of the first major surface of the first sheet of glazing material and the stem portion extends beyond the second major surface of the first sheet of glazing material; further wherein the first sheet of adhesive interlayer material is on the first major surface of the first sheet of glazing material and covers the first surface of the head portion.

Preferably the first hole is inboard a peripheral edge of the first sheet of glazing material.

Preferably the glazing fitting comprises a washer positioned in the first hole and the head portion is positioned in the washer such that the washer is between the head the bolt and a wall of the first hole, the wall of the first hole being between the first and second major surfaces of the first sheet of glazing material. Preferably the washer is a cup washer.

Preferably the first surface of the head portion is flat, or substantially flat.

Preferably the head portion is a countersunk head portion. In such embodiments the bolt may be referred to as a countersunk bolt.

Preferably the first surface of the head portion is aligned with the first major surface of the first sheet of glazing material.

Preferably the first sheet of adhesive interlayer material comprises an ionomer polymer, polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the first sheet of adhesive interlayer material has a thickness between 0.3 mm and 5 mm, more preferably between 0.38 mm and 1 mm.

Preferably the first sheet of glazing material comprises a sheet of glass, in particular a sheet of float glass.

Preferably the first sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%.

Preferably the first sheet of glazing material is thermally or chemically toughened glass.

Preferably the first sheet of glazing material has a thickness between 4 mm and 25 mm, more preferably between 6 mm and 20 mm.

The stem portion has a length and a first axis running along the length of the stem portion.

Preferably the stem portion is cylindrical having a first end adjacent the head portion and an opposite second end, and wherein a portion of the curved surface of the cylindrical stem portion has been removed to provide the fluid pathway.

Preferably the stem portion has a length and the fluid pathway comprises a flat portion running along the length of the stem portion, more preferably wherein the fluid pathway comprises a flat portion running along the entire length of the stem portion.

Preferably the stem portion is configured to engage with a mechanical fastener and wherein the mechanical fastener comprises a body portion having a hole therein, the hole in the body portion of the mechanical fastener being configured to engage with the stem portion.

In some embodiments the first hole is a countersunk hole and the head portion is a countersunk head portion.

Preferably the first surface of the head portion is aligned with the first major surface of the first sheet of glazing material.

Preferably the glazing fitting comprises a washer positioned in the first hole and the head portion is positioned in the washer such that the washer is between the head portion of the bolt and a wall of the first hole, the wall of the first hole being between the first and second major surfaces of the first sheet of glazing material. Preferably the washer is a cup washer.

In some embodiments a mechanical fastener is engaged with the stem portion.

Preferably the mechanical fastener comprises a body portion having a hole therein, the hole being configured to engage with the stem portion, wherein the stem portion has circular symmetry about the first axis and the hole in the body portion of the mechanical fastener is configured such that when the stem portion is attached to the mechanical fastener the fluid pathway extends through the mechanical fastener. The hole in the body portion of the mechanical fastener is preferably non-circular in such embodiments.

Preferably the mechanical fastener comprises a body portion having a hole therein, the hole being configured to engage with the stem portion, wherein the hole in the body portion of the mechanical fastener is circular and the stem portion has a portion thereof removed such that when the stem portion is attached to the mechanical fastener the fluid pathway extends through the mechanical fastener.

Preferably the mechanical fastener comprises a body portion having a hole therein, the hole being configured to engage with the stem portion, wherein the stem portion has a portion thereof removed and the hole in the body portion of the mechanical fastener is non-circular such that when the stem portion is attached to the mechanical fastener the fluid pathway extends through the mechanical fastener.

In some embodiments the stem portion comprises a threaded region for engagement with a suitably configured mechanical fastener.

Preferably the mechanical fastener comprises a body portion having a hole therein, the hole being configured to engage with the stem portion, wherein the stem portion has circular symmetry about the first axis and the hole in the body portion of the mechanical fastener is configured such that when the stem portion is attached to the mechanical fastener the fluid pathway extends through the mechanical fastener. The hole in the body portion of the mechanical fastener is preferably non-circular in such embodiments.

Preferably the mechanical fastener comprises a body portion having a hole therein, the hole being configured to engage with the stem portion, wherein the hole in the body portion of the mechanical fastener is circular and the stem portion has a portion thereof removed such that when the stem portion is attached to the mechanical fastener the fluid pathway extends through the mechanical fastener.

Preferably the mechanical fastener comprises a body portion having a hole therein, the hole being configured to engage with the stem portion, wherein the stem portion has a portion thereof removed and the hole in the body portion of the mechanical fastener is non-circular such that when the stem portion is attached to the mechanical fastener the fluid pathway extends through the mechanical fastener.

In some embodiments the head portion comprises at least a first channel extending therethrough, the first channel communicating at a first end with an entrance hole in the first surface of the head portion and at a second end with an exit hole in the second surface of the head portion.

The provision of at least one channel in the head portion provides an additional fluid pathway to help remove fluid such as air that may be trapped between the first surface of the head portion and the first sheet of adhesive interlayer material during a lamination process to make the laminated glazing panel.

Preferably the first channel is configured such that between the first and second ends thereof some of the first sheet of adhesive interlayer material operatively communicates with the first channel to attach the glazing fitting to the first sheet of adhesive interlayer material.

Preferably some of the first sheet of adhesive interlayer material extends through the exit hole in the second surface of the head portion, preferably wherein some of the first sheet of adhesive interlayer material extends through the exit hole in the second surface of the head portion to contact the second surface of the head portion.

In some embodiments the stem portion is cylindrical having a diameter d and a length l and having a first end adjacent the head portion and an opposite second end and wherein a portion of the curved surface of the cylindrical stem portion has been removed to provide the fluid pathway.

Preferably the fluid pathway comprises a flat portion running along the length of the stem portion.

Preferably the fluid pathway comprises a flat portion running along the entire length of the stem portion.

Preferably the flat portion has a width and a length, wherein the width of the flat portion is between d/20 and d, more preferably between d/10 and d, even more preferably between d/5 and d.

Preferably the flat portion has a width and a length, wherein the length of the flat portion is between l and l/10, more preferably between l and l/5, even more preferably between l and l/2.

When the length of the flat portion is less than l, it is preferred that the flat portion is at the first end of the stem portion.

Preferably the stem portion has a diameter between 5 mm and 50 mm.

When the stem portion has a threaded portion, the diameter of the stem portion is suitably the distance between opposite sides of a thread, or an average diameter taking the depth of the thread into account. Alternatively, the diameter of the stem portion may be the diameter of the stem portion before the threaded portion was added thereto.

In some embodiments the laminated glazing panel further comprises a second sheet of glazing material, the second sheet of glazing material being joined to the first sheet of glazing material by the interlayer structure therebetween.

Preferably the second sheet of glazing material has no holes therein.

Preferably the second sheet of glazing material has a thickness between 4 mm and 25 mm, more preferably between 6 mm and 20 mm.

Preferably the second sheet of glazing material comprises a sheet of glass, in particular a sheet of float glass.

Preferably the second sheet of glazing material comprises a sheet of soda-lime-silicate glass. Preferably the soda-lime-silicate glass has a composition comprising (by weight), $SiO_2$ 69-74%; $Al_2O_3$ 0-3%; $Na_2O$ 10-16%; $K_2O$ 0-5%; $MgO$ 0-6%; $CaO$ 5-14%; SO3 0-2% and $Fe_2O_3$ 0.005-2%.

Preferably the second sheet of glazing material has a thickness between 4 mm and 25 mm, more preferably between 6 mm and 20 mm.

Preferably the second sheet of glazing material is thermally or chemically toughened glass.

In some embodiments the fluid pathway comprises a hole running through the stem portion and through the first surface of the head portion.

BRIEF DESCRIPTION OF THE DRAWINGS

Embodiments of the present invention will now be described by way of example only with reference to the accompanying drawings, in which:

FIG. 1 shows a schematic side view of a bolt and cup washer that are used to make a laminated glazing panel in accordance with the present invention;

FIG. 2 is a plan view of the bolt shown in FIG. 1;

FIG. 3 is a plan view of the cup washer shown in FIG. 1;

FIG. 4 is a plan view of the bolt in the cup washer shown in FIG. 1;

FIG. 5 shows a schematic isometric view of a bolt having a flat portion along the threaded stem portion, a cup washer and a mechanical fastener for screwing onto the threaded portion of the bolt;

FIG. 8 shows a schematic cross-sectional view of a laminated glazing panel made according to the present invention and a part exploded view of a mechanical fastener for connection to a bracket.

DETAILED DESCRIPTION OF THE INVENTION

Figure 6:
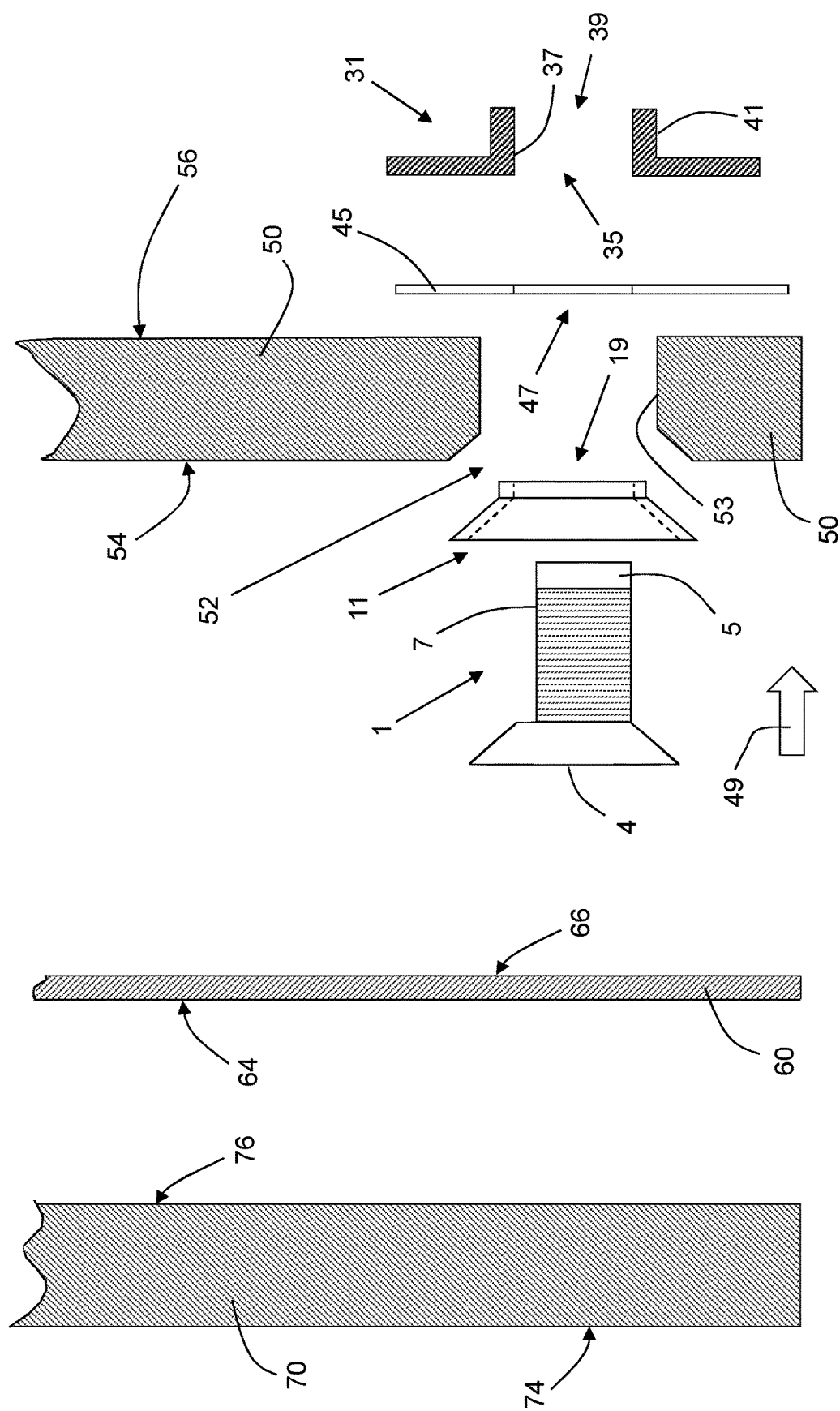
FIG. 6 shows an unlaminated stack of components for making a laminated glazing panel using a method according to the present invention.

FIG. 1 shows a schematic cross-sectional view of a bolt 1 and a cup washer 11 that are used in the manufacture of a laminated glazing panel using a method in accordance with the present invention. FIG. 2 is a plan view of the bolt shown in FIG. 1. FIG. 3 is a plan view of the cup washer shown in FIG. 1. FIG. 4 is a plan view of the bolt and cup washer of FIG. 1 where the bolt is in the cup washer.

With reference to FIGS. 1-4, the bolt 1 is made of stainless steel and has a countersunk head portion 3 and a stem portion 5 integrally formed therewith. In this embodiment the stem portion 5 is threaded for engagement with a suitably sized nut (not shown) or other similar mechanical fastener. The stem portion 5 has a flat portion 7 running along the length thereof. The flat portion 7 may be formed by suitably milling a conventional stainless-steel bolt having a cylindrical threaded stem portion. In this example the flat portion 7 extends along the entire length of the stem portion but may instead only run along a portion thereof extending from the countersunk head portion 3.

The countersunk head portion 3 has a flat first surface 4 and an opposing second surface 6 tapered towards the stem portion 5.

The first surface 4 intersects with the second surface 6 to define an edge 8 of the countersunk head portion 3. The first surface 4 has a circular outer perimeter defined by the edge 8.

The cup washer 11 is a washer having an opening 19 at one end thereof (and another opening at the opposite end, not labelled). The cup washer 11 has an external wall 13 and an internal wall 15. The internal wall 15 is suitably configured such that the countersunk head portion 3 of the bolt 1 can nest therein i.e. by moving the bolt 1 in the direction of arrow 10. The separation of the external wall 13 and the internal wall 15 defines the thickness of the cup washer. At one end the cup washer 11 has a minor surface 14. The minor surface 14 is flat.

The cup washer 11 has a collar portion 17 having an inner wall 18 that defines the periphery of the opening 19 in the cup washer. The opening 19 is suitably sized such that the stem portion 5 of the bolt 1 can pass therethrough.

In use, the cup washer is usually in direct contact with the glazing material, for example soda-lime-silicate glass, so the cup washer 11 is typically made from a softer material than the bolt 1. It is preferred that the bolt 1 is made from stainless steel and the cup washer 11 is made from aluminium.

When viewed in the direction of arrow 2 i.e. in plan view, the countersunk head portion 3 is circular i.e. the edge 8 can be seen to be circular and defines the outer perimeter of the first surface 4.

The view of the bolt 1 in FIG. 1 is essentially a cross-section through the line j-j' of FIG. 2. The stem portion 5 is perpendicular to the flat first surface 4 of the head portion 3. The flat portion 7 of the stem portion 5 is perpendicular to the flat first surface 4 of the head portion 3.

As more clearly seen in the plan view of FIG. 3 (i.e. viewed in the direction of arrow 2), the cup washer 11 has a circular opening 19 therein defined by the inner wall 18 of the collar portion 17. The cup washer has a circular periphery and the internal surface 15 is configured such that the countersunk head portion 3 of the bolt 1 can nest therein.

FIG. 4 shows a plan view when the bolt 1 is inserted through the opening 19 in the cup washer 11. The stem portion 5 extends through the hole 19 and is configured to be a sliding fit with the inner wall 18 of the collar portion 17. Due to the flat portion 7 of the stem portion 5, there is a space 21 between the inner wall 18 of the collar portion 17 and the stem portion 5.

FIG. 5 shows an isometric representation of the bolt 1 and cup washer 11 shown in FIG. 1 to help illustrate the flat portion 7. Also shown is an inner flange 31 that may be screwed onto the threaded stem portion 5.

As shown in FIG. 5, the bolt 1 has a countersunk head portion 3 with a stem portion 5 extending therefrom. The stem portion 5 is threaded, having a threaded portion 5'.

The cup washer 11 has an inner surface configured such that the countersunk head portion 3 nests therein. The stem portion 5 of the bolt passes through the opening 19 in the end of the cup washer 11 The opening 19 is defined by the inner wall 18 of the collar portion 17. The opening 19 is circular.

The inner flange 31 is a mechanical fastener that may be engaged with the threaded stem portion 5. The inner flange is of unitary construction and made of stainless steel and comprises a circular base portion 33 having a circular hole 35 therein. The circular base portion has flat opposing major surfaces. A collar 36 extends upwardly from the base portion 33 and has a threaded inner wall 37 for screwing onto the threaded stem portion 5. The end of the collar opposite the base portion is also a circular opening 39. The outer wall 41 of the collar 36 is threaded for engagement with other mechanical fasteners, as will be described hereinafter.

In use, there is usually a flat washer between the cup washer 11 and the inner flange 31. The flat washer is usually made of a material that is softer than the material from which the bolt and inner flange is made. The flat washer is usually made of aluminium when the bolt and inner flange are made of stainless steel.

When the inner flange 31 is screwed onto the stem portion 5, due to the flat portion 7 of the stem portion 5, a portion of the circular opening 39 remains open to form a fluid passageway.

In an alternative embodiment to that shown in relation to FIGS. 1-5, the flat portion 7 may comprise two or more flat portions having differently sized flat regions. In such embodiments each flat portion may be aligned or in a stepped arrangement. However, having a single flat region 7 as shown in relation to FIGS. 1-5 is simpler to make by milling the stem of a conventional bolt.

FIG. 6 shows an unlaminated stack of components for making a laminated glazing panel using a method according to the present invention. A bolt 1 and cup washer 11 as described with reference to FIGS. 1-5 is used in the manufacture of the laminated glazing panel.

A method according to an embodiment of the invention shall now be described.

A first sheet of glass 50 is provided having a suitable countersunk hole 52 therein configured for the cup washer 11 to nest therein. The first sheet of glass 50 has a first major surface 54 and an opposing second major surface 56. The countersunk hole 52 has a wall 53 in between the first and second major surfaces 54, 56 of the first sheet of glass 50. The countersunk hole 52 has a first opening in first major surface 54 and a second opening in the second major surface 56. The first opening in the first major surface 54 is circular and the second opening in the second major surface 56 is also circular but has a smaller diameter than the first opening.

In plan view, the first sheet of glass 50 has a rectangular periphery and the countersunk hole 52 is inboard of the periphery i.e. inboard of the peripheral edge of the first sheet of glass 50.

The cup washer 11 is then inserted into the countersunk hole 52. The external surface (external wall 13) of the cup washer 11 is configured to nest in the countersunk hole 52. Next, the bolt 1 is moved in the direction of arrow 49 so that the stem portion 5 passes through the opening 19 in the cup washer 11 to extend beyond the second major surface 56 of the first sheet of glass 50.

The bolt 1 is then clamped to the first sheet of glass sheet prior to lamination by using a suitable mechanical fastener engaged with the stem portion 5. In this example an inner flange 31 as previously described is screwed onto the threaded stem portion 5. A suitable washer 45 is first positioned on the stem portion 5 to prevent the inner flange 31 from directly contacting the second major surface 36 of the first sheet of glass 50. The washer 45 is flat and made of aluminium and has a circular periphery. A circular hole 47 is positioned at the centre of the washer 45 and is configured such that the stem portion 5 of the bolt 1 can pass therethrough. The inner flange 31 may be tightened to a desired torque to clamp the bolt 1 to the first sheet of glass 50 prior to a lamination process. As described above, when the inner flange 31 is screwed onto the stem portion 5 a space remains in the opening 39 due to the flat portion 7 of the stem portion.

Next a sheet of ionomer polymer 60 is positioned on the first major surface 54 of the first sheet of glass 50. The sheet of ionomer polymer 60 has no holes therein and covers the first surface 4 of the head portion of the bolt 1.

The sheet of ionomer polymer 60 has a first major surface 64 and a second opposing major surface 66 and in this example is sized to be congruently stacked with the sheet of glass 60 i.e. the edges of the first sheet of glass 50 are aligned with the edges of the sheet of ionomer polymer 60 when the sheet of ionomer polymer 60 is positioned on the first sheet of glass 50. In other embodiments at least one edge of the first sheet of glass 50 is aligned with at least one edge of the sheet of ionomer polymer 60 when the sheet of ionomer polymer 60 is positioned on the first sheet of glass 50.

Next a second sheet of glass 70 is positioned on the sheet of ionomer polymer 60. The second sheet of glass 70 has a first major surface 74 and a second opposing major surface 76. The second sheet of glass 70 is sized to be coextensive with the sheet of ionomer polymer 60 such that when the second sheet of glass 70 is on the sheet of ionomer polymer 60, the second sheet of glass 70 is congruently stacked therewith. The second sheet of glass 70 does not have any holes therein, in particular there is no hole in the second sheet of glass directly opposite the countersunk hole 52 in the first sheet of glass 50. In use, preferably the second sheet of glass 70 would be an external pane, and the first sheet of glass 50 would be an internal pane.

A schematic cross-sectional representation of a portion of the congruent stack described above prior to lamination is shown in FIG. 7. The bolt 1 is shown clamped to the first sheet of glass 50 prior to lamination as discussed above.

In order to produce a laminated glazing panel, the unlaminated congruent stack of components is laminated at a suitable temperature and pressure to join the first sheet of glass 50 to the second sheet of glass 70 by the sheet of ionomer polymer 60.

During the lamination process, the unlaminated congruent stack of components may be placed in a vacuum bag or the like to evacuate air from between the components of the unlaminated stack.

Figure 7:
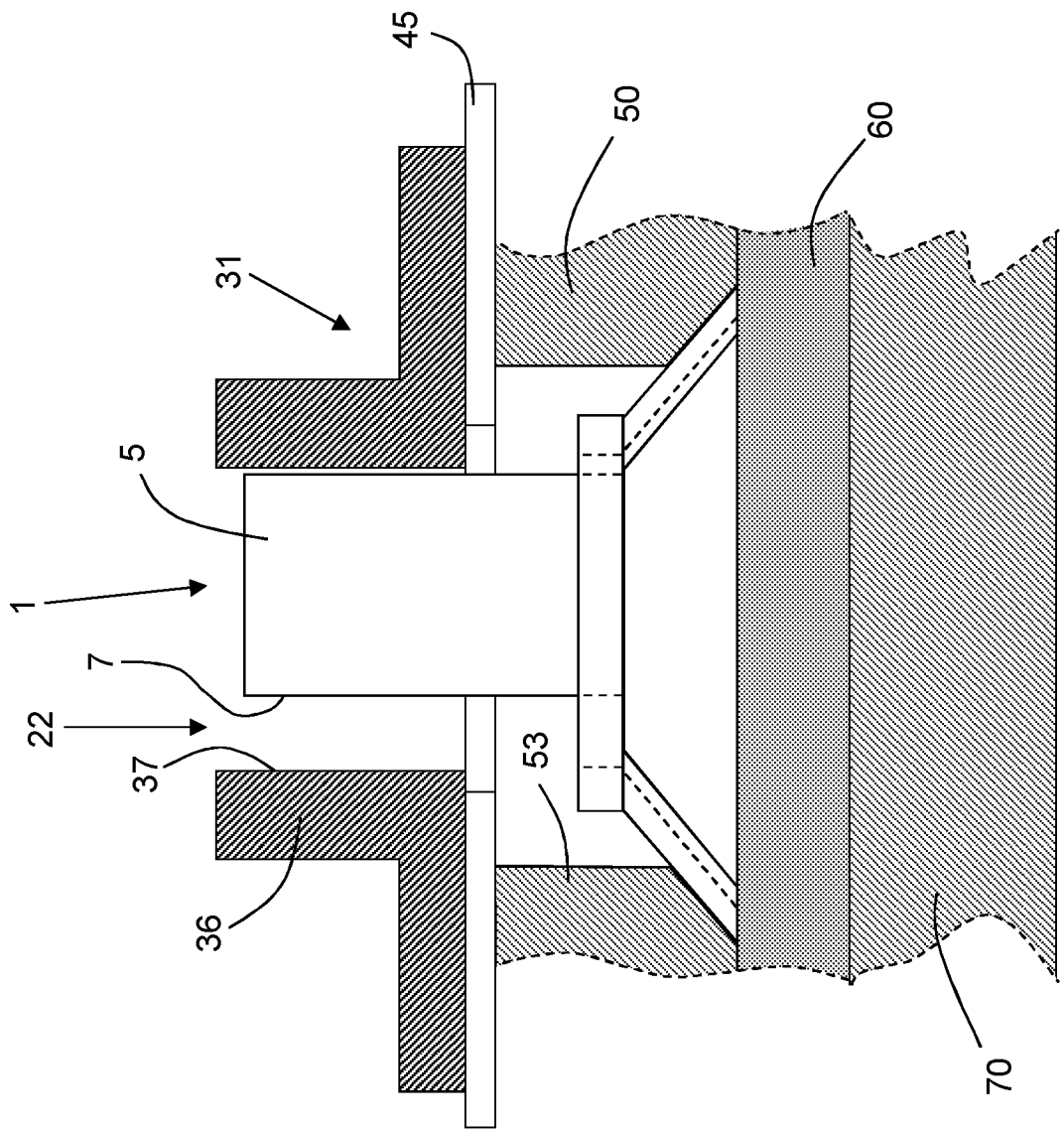
FIG. 7 shows a close-up view of the bolt in the washer in the countersunk hole in the sheet of glass prior to a lamination process.

As can be seen with reference to FIGS. 6 and 7, the flat first surface 4 of the head portion 3 is in contact with the sheet of ionomer polymer 60 and aligned with the first major surface 54 of the first sheet of glass 50 (as is minor surface 14 of the cup washer 11). Due to the material of the head portion and surrounding glass sheet being different (stainless steel compared to glass), there is a potential for different adhesion of the sheet of ionomer polymer to the flat surface of the head portion and the first major surface of the first sheet of glass 50. Furthermore, there may be air trapped under the flat first surface 4 of the head portion (i.e. between the flat first surface 4 and the second major surface 66 of the sheet of ionomer polymer 60) which may lead to an increased potential for delamination in this region. Additionally, any trapped air in this region may result in a void or other optical defect that is visible through the second sheet of glass 70.

By using a bolt having a flat portion 7 along the stem thereof, there is a space 22 between the inner wall 37 of the collar 36 and the flat portion 7 of the stem portion 5. There is also a space between the stem portion 5 and the wall 53 of the countersunk hole in the first sheet of glass 50.

The space 22 provides a fluid pathway through which air trapped between the flat first surface 4 of the head portion 3 and the sheet of ionomer polymer may be evacuated. The space 22 also assists with the removal of any air trapped between the cup washer 11 and the head portion 3 and/or stem portion 5.

For a sheet of ionomer polymer such as SentryGlas Plus® available from DuPont, a temperature of around 140° C. and a pressure of 5-15 bar was found acceptable to join the unlaminated stack together to form a laminated glazing panel. If a different adhesive interlayer is used, the lamination temperature is adjusted accordingly and may be in the region of 70° C. to 170° C.

Following lamination, additional mechanical fasteners may be used to attach the laminated glazing panel to a building. This is described in more detail with reference to FIGS. 8 and 9.

Figure 9:
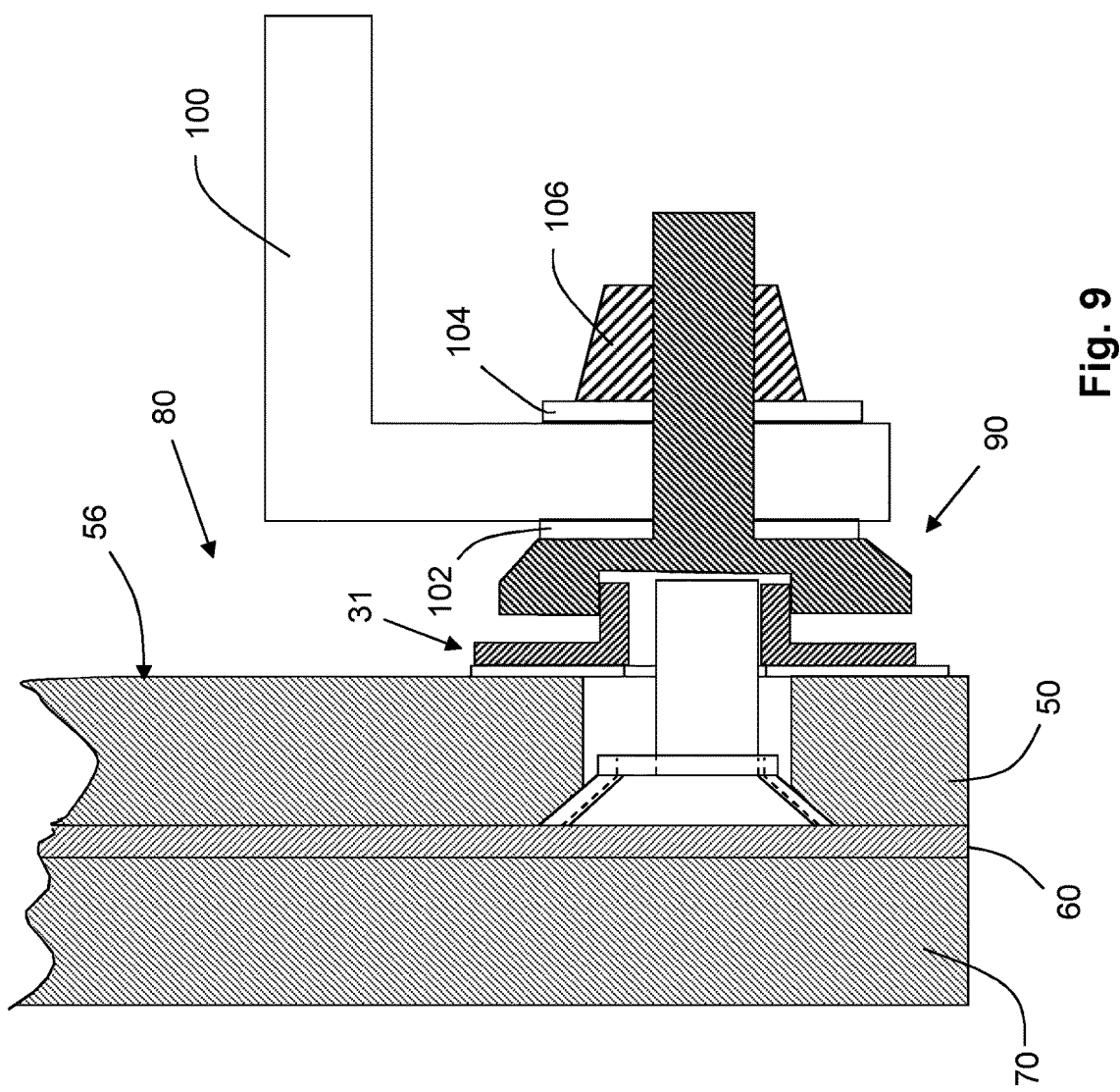
FIG. 9 shows a schematic cross-sectional view of a laminated glazing panel according to the present invention shown attached to a bracket in a building.

FIG. 8 shows in more detail the laminated glazing panel 80 and additional components that may be part of the glazing fitting. FIG. 9 also shows how additional mechanical fasteners elements may be secured to the glazing fitting to allow the laminated glazing panel 80 to be attached to a building or the like.

As described above, the laminated glazing panel 80 has a bolt 1 and cup washer 11 secured in the hole in the first sheet of glass 50 because the first sheet of glass 50 is joined to the second sheet of glass 70 by the sheet of ionomer polymer 60.

With the inner flange 31 screwed onto the threaded stem portion 5, an outer flange 90 may be attached thereto. The outer flange 90 has a body portion 92 having an opening 94 therein with a threaded wall 96 for screwing onto the threaded outer wall 41 of the collar of the inner flange 31. The outer flange 90 also has integrally formed therewith a mounting portion 98. The outer flange 90 is also made of stainless steel.

The mounting portion 98 may be used to attach the laminated glazing panel 80 to a bracket 100 attached to a support structure in a building. The laminated glazing panel 80 may be a pane in a façade or other frameless glazing system.

The mounting portion 98 passes through an opening in the bracket 100 (which is made from stainless steel). Stainless steel washers 102, 104 are positioned either side of the opening in the bracket 100 and the mounting portion 98 passes through holes in the washers 102, 104.

The mounting portion 98 has a threaded portion 99 for engagement with a suitable nut 106 to secure the outer flange 90 to the bracket 100 (and hence the laminated glazing panel 80) to the bracket when the outer flange 90 is connected to the inner flange 31.

In use, the second sheet of glass 70 is an external pane (i.e. facing the outside of the building in which the laminated glazing panel 60 is installed) and the first sheet of glass 50 is an inner pane.

With reference to FIGS. 1 and 7-9, the head portion 3 may be configured to have at least a first channel extending between the first surface 4 of the head portion and the second surface 6 of the head portion. The first channel has a first end and a second end. The first channel is configured to communicate with an entrance hole in the first surface 4 of the head portion 3 at the first end, and with an exit hole in the second surface 6 of the head portion 3 at the second end.

The provision of at least a first channel in the head portion provides another fluid pathway to help remove fluid such as air that may be trapped between the first surface of the head portion and the first sheet of adhesive interlayer material during a lamination process to make the laminated glazing panel. The first channel is in fluid communication with the fluid pathway created by the bolt having a flat portion along the stem thereof.

During the lamination process the temperature of the unlaminated stack is raised which causes the sheet of ionomer polymer to soften and flow. If the head portion 3 is configured as described with at least a first channel extending between the first surface 4 and the opposing second surface 6, following the lamination process some of the ionomer material can flow into the first channel. The head portion 3 (and consequently the bolt 1) becomes attached to the sheet of ionomer polymer 60.

Ionomer material from the sheet of ionomer material 60 may flow through the exit hole of the first channel (in the second surface 6 of the head portion 3) and may contact the second surface 6 of the head portion to attach the head portion 3 (and consequently bolt 1) to the sheet of ionomer polymer 60.

The present invention provides an advantage that trapped air between the head portion of the bolt and the sheet of adhesive interlayer material may be minimised following a lamination process used to make the laminated glazing panel thereby reducing the potential for delamination in the region between the bolt and the adhesive interlayer material. During lamination, fluid i.e. air trapped between the head portion and the sheet of adhesive interlayer material may be removed via a fluid pathway associated with the bolt.

The invention claimed is:

1. A method for making a laminated glazing panel comprising a first sheet of glazing material joined to an interlayer structure comprising at least a first sheet of adhesive interlayer material, the method comprising the steps:
   (i) providing a first sheet of glazing material having at least a first hole extending between a first major surface and a second major surface thereof;
   (ii) providing a glazing fitting comprising: a bolt having a head portion and a stem portion extending therefrom, the head portion having a first surface and an opposing second surface and the stem portion defines a length and a cylindrical radially outer surface, having a first end adjacent the head portion and an opposite second end, wherein a portion of the radially outer surface of the cylindrical stem portion is non-cylindrical to define a fluid pathway running along the length of the stem portion;
   (iii) positioning the head portion in the hole such that the first surface of the head portion faces in the direction of the first major surface of the first sheet of glazing material and the stem portion extends beyond the second major surface of the first sheet of glazing material;
   (iv) providing a first sheet of adhesive interlayer material;
   (v) positioning the first sheet of adhesive interlayer material on the first major surface of the first sheet of glazing material to cover the first surface of the head portion; and
   (vi) laminating the first sheet of adhesive interlayer material to the first sheet of glazing material using suitable lamination conditions;
   wherein during step (vi) fluid trapped between the first surface of the head portion and the first sheet of adhesive interlayer material is removed via the fluid pathway.

2. The method according to claim 1, wherein the glazing fitting comprises a washer configured to fit in the first hole in the first sheet of glazing material and configured such that the head portion nests therein, and wherein the washer is positioned in the first hole in the first sheet of glazing material before step (iii), such that at step (iii), the head portion is positioned in the washer that is positioned in the first hole in the first sheet of glazing material.

3. The method according to claim 1, wherein the head portion is a countersunk head portion and/or wherein after the head portion has been positioned in the first hole at step (iii), the first surface of the head portion is aligned with the first major surface of the first sheet of glazing material.

4. The method according to claim 1, wherein a portion of the cylindrical radially outer surface of the stem portion has been removed to provide the fluid pathway.

5. The method according to claim 1, wherein the stem portion has a length and the fluid pathway comprises a flat portion running along the length of the stem portion.

6. The method according to claim 1, wherein after step (iii) and before step (vi) a mechanical fastener is attached to the stem portion to clamp the bolt to the first sheet of glazing material; or wherein after step (iii) and after step (vi) a mechanical fastener is attached to the stem portion to clamp the bolt to the first sheet of glazing material.

7. The method according to claim 1, wherein the head portion comprises at least a first channel extending therethrough, the first channel communicating at a first end with an entrance hole in the first surface of the head portion and at a second end with an exit hole in the second surface of the head portion.

8. The method according to claim 7, wherein during step (vi) some of the first sheet of adhesive interlayer material flows into the first channel so that after step (vi) the glazing fitting is attached to the first sheet of adhesive interlayer material.

9. The method according to claim 1, wherein the fluid pathway comprises a hole running through the stem portion and through the first surface of the head portion.

10. The method according to claim 1, wherein the first sheet of adhesive interlayer material comprises an ionomer polymer, polyvinyl butyral (PVB), acoustic modified PVB, a copolymer of ethylene, ethylene vinyl acetate (EVA), polyurethane (PU), polycarbonate, poly vinyl chloride (PVC) or a copolymer of ethylene and methacrylic acid and/or wherein following step (v) a second sheet of glazing material, is positioned on the first sheet of adhesive interlayer material such that following step (vi) the laminated glazing panel produced has the first sheet of adhesive interlayer material between the first and second sheets of glazing material.

11. The method according to claim 1, wherein the first hole is inboard a peripheral edge of the first sheet of glazing material.

12. A laminated glazing panel comprising: a first sheet of glazing material joined to an interlayer structure comprising at least a first sheet of adhesive interlayer material; the first sheet of glazing material having at least a first hole extending between a first major surface and a second major surface thereof; the laminated glazing panel comprising a glazing fitting comprising a bolt having a head portion and a stem portion extending therefrom, the head portion having a first surface and an opposing second surface and the stem portion being configured with at least one fluid pathway associated therewith; wherein the head portion is positioned in the first hole such that the first surface of the head portion faces in the direction of the first major surface of the first sheet of glazing material and the stem portion extends beyond the second major surface of the first sheet of glazing material; further wherein the first sheet of adhesive interlayer material is on the first major surface of the first sheet of glazing material and covers the first surface of the head portion; wherein the stem portion defines a length and a cylindrical radially outer surface, having a first end adjacent the head portion and an opposite second end; and wherein a portion of the radially outer surface of the cylindrical stem portion is non-cylindrical to define a fluid pathway running along the length of the stem portion.

13. The laminated glazing panel according to claim 12, wherein the fluid pathway comprises a flat portion running along the length of the stem portion.

14. The laminated glazing panel according to claim 12, wherein the head portion comprises at least a first channel extending therethrough, the first channel communicating at a first end with an entrance hole in the first surface of the head portion and at a second end with an exit hole in the second surface of the head portion.

15. The laminated glazing panel according to claim 14, wherein some of the first sheet of adhesive interlayer material is in the first channel to attach the glazing fitting to the first sheet of adhesive interlayer material; or wherein the first channel is configured such that between the first and second ends thereof some of the first sheet of adhesive interlayer material operatively communicates with the first channel to attach the glazing fitting to the first sheet of adhesive interlayer material.

16. The laminated glazing panel according to claim 14, wherein some of the first sheet of adhesive interlayer material extends through the exit hole in the second surface of the head portion.

17. The laminated glazing panel according to claim 12, further comprising a second sheet of glazing material, the second sheet of glazing material being joined to the first sheet of glazing material by the interlayer structure therebetween.

18. The laminated glazing panel according claim 12, wherein the first sheet of adhesive interlayer material has a thickness between 0.3 mm and 5 mm and/or wherein the first sheet of adhesive interlayer material comprises an ionomer polymer, polyvinyl butyral (PVB), acoustic modified PVB, a copolymer of ethylene, ethylene vinyl acetate (EVA), polyurethane (PU), polycarbonate, poly vinyl chloride (PVC) or a copolymer of ethylene and methacrylic acid.

19. The laminated glazing panel according to claim 12, wherein the first hole is inboard a peripheral edge of the first sheet of glazing material and/or wherein the first sheet of glazing material comprises a sheet of glass.

20. A laminated glazing panel comprising: a first sheet of glazing material joined to an interlayer structure comprising at least a first sheet of adhesive interlayer material; the first sheet of glazing material having at least a first hole extending between a first major surface and a second major surface thereof; the laminated glazing panel comprising a glazing fitting comprising a bolt having a head portion and a stem portion extending therefrom, the head portion having a first surface and an opposing second surface and the stem portion being configured with at least one fluid pathway associated therewith; wherein the head portion is positioned in the first hole such that the first surface of the head portion faces in the direction of the first major surface of the first sheet of glazing material and the stem portion extends beyond the second major surface of the first sheet of glazing material; further wherein the first sheet of adhesive interlayer material is on the first major surface of the first sheet of glazing material and covers the first surface of the head portion; wherein the stem portion defines a length and a cylindrical radially outer surface, having a first end adjacent the head portion and an opposite second end; wherein a portion of the cylindrical radially outer surface of the cylindrical stem portion has been removed to provide the fluid pathway; and wherein the fluid pathway comprises a portion running along the length of the stem portion.

* * * * *